United States Patent
Handa

(10) Patent No.: US 7,846,987 B2
(45) Date of Patent: Dec. 7, 2010

(54) EXPANDED AND EXTRUDED BIODEGRADABLE AND REDUCED EMISSION FOAMS MADE WITH METHYL FORMATE-BASED BLOWING AGENTS

(75) Inventor: Y. Paul Handa, Pittsford, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 11/955,034

(22) Filed: Dec. 12, 2007

(65) Prior Publication Data

US 2008/0146686 A1  Jun. 19, 2008

Related U.S. Application Data

(60) Provisional application No. 60/869,932, filed on Dec. 14, 2006.

(51) Int. Cl.
- C08J 9/16 (2006.01)
- C08J 9/18 (2006.01)
- C08J 9/00 (2006.01)
- C08J 9/12 (2006.01)

(52) U.S. Cl. .............................. 521/87; 521/56; 521/60; 521/79; 521/82; 521/97; 521/98

(58) Field of Classification Search .................... 521/60, 521/56, 79, 82, 87, 97, 98
See application file for complete search history.

(56) References Cited

U.S. PATENT DOCUMENTS

| | | | |
|---|---|---|---|
| 2,816,827 A | 12/1957 | Roth | |
| 2,861,898 A | 11/1958 | Platzer | |
| 2,911,382 A | 11/1959 | Barkhuff et al. | |
| 2,983,962 A | 5/1961 | Merz et al. | |
| 3,085,073 A | 4/1963 | Lintner et al. | |
| 3,089,857 A | 5/1963 | Pottenger | |
| 3,279,799 A | 10/1966 | Proctor | |
| 3,281,259 A | 10/1966 | Lux et al. | |
| 3,290,198 A | 12/1966 | Lux et al. | |
| 3,358,073 A | 12/1967 | Ohsol | |
| 3,407,151 A | 10/1968 | Overcashier et al. | |
| 3,409,199 A | 11/1968 | Lake | |
| 3,577,360 A | 5/1971 | Immel | |
| 3,644,230 A | 2/1972 | Cronin | |
| 3,670,916 A | 6/1972 | Alpert | |
| 3,759,641 A | 9/1973 | Immel | |
| 3,855,377 A | 12/1974 | Uebewhart et al. | |
| 3,864,444 A | 2/1975 | Johnson | |
| 3,900,433 A | 8/1975 | Taub et al. | |
| 3,914,191 A | 10/1975 | Scott | |
| 3,929,686 A | 12/1975 | Stevenson | |
| 3,961,000 A | 6/1976 | Ropiequet | |
| 3,962,154 A | 6/1976 | Egli | |
| 3,976,605 A | 8/1976 | Matsunaga et al. | |
| 4,009,976 A | 3/1977 | Johnson | |
| 4,033,010 A | 7/1977 | McCalla | |
| 4,042,658 A | 8/1977 | Collins | |
| 4,098,941 A | 7/1978 | Johnson | |
| 4,104,440 A | 8/1978 | Collins | |
| 4,214,054 A | 7/1980 | Watanabe et al. | |
| 4,272,469 A | 6/1981 | Smith | |
| 4,323,528 A | 4/1982 | Collins | |
| 4,557,881 A | 12/1985 | Rabotski | |
| 4,695,595 A | 9/1987 | Blount | |
| 4,769,396 A | 9/1988 | Blount | |
| 4,916,166 A | 4/1990 | Suh et al. | |
| 4,943,459 A | 7/1990 | Nedzu | |
| 4,960,804 A | 10/1990 | Doerge | |
| 4,997,858 A | 3/1991 | Jourquin et al. | |
| 5,026,736 A | 6/1991 | Pontiff | |
| 5,064,872 A | 11/1991 | Monstrey et al. | |

(Continued)

FOREIGN PATENT DOCUMENTS

DE    4230097 A1 * 9/1992

(Continued)

OTHER PUBLICATIONS

Written translation of DE 4230097 A1 received from the McElroy Translation Company on Dec. 15, 2009.*

(Continued)

*Primary Examiner*—Mark Eashoo
*Assistant Examiner*—Melissa Rioja
(74) *Attorney, Agent, or Firm*—Baker Botts LLP

(57) ABSTRACT

Expanded and extruded biodegradable polymer foams are obtained using biodegradable polymers and environmentally benign non-VOC methyl formate as a blowing agent. The blowing agent can be a blend further including at least one co-blowing agent, preferably an environmentally friendly species (e.g., non-VOC), which is either a physical co-blowing agent (e.g. an inorganic agent, a hydrocarbon, a halogenated hydrocarbon, a hydrocarbon with polar, functional group(s), water or any combination thereof), or a chemical co-blowing agent, or combinations thereof. The blowing agent blend can include any combination of methyl formate and one or more co-blowing agents. The polymer foam can include a biodegradable polymer or its blends with other biodegradable polymers or conventional (non-biodegradable) polymers. The methyl formate-based blowing agent blends produce stable foams for various applications, including containers, packaging systems, as well as for insulation and protective cushioning. Processes for the preparation of such foams are also provided.

29 Claims, 4 Drawing Sheets

U.S. PATENT DOCUMENTS

| | | | |
|---|---|---|---|
| 5,110,838 A | 5/1992 | Tokiwa et al. | |
| 5,116,880 A | 5/1992 | Tokiwa et al. | |
| 5,120,481 A | 6/1992 | Brackman et al. | |
| 5,134,171 A | 7/1992 | Hammel et al. | |
| 5,149,473 A | 9/1992 | LeDuc | |
| 5,166,182 A | 11/1992 | Blanpied | |
| 5,210,108 A * | 5/1993 | Spinu et al. | 521/182 |
| 5,216,050 A | 6/1993 | Sinclair | |
| 5,225,490 A | 7/1993 | Tokiwa et al. | |
| 5,227,408 A | 7/1993 | Hanna et al. | |
| 5,242,494 A | 9/1993 | Callaghan et al. | |
| 5,252,642 A | 10/1993 | Sinclair et al. | |
| 5,283,003 A | 2/1994 | Chen | |
| 5,308,528 A | 5/1994 | Desbiendras et al. | |
| 5,336,696 A | 8/1994 | Ashida | |
| 5,348,983 A | 9/1994 | Sterzel | |
| 5,378,792 A | 1/1995 | Sterzel | |
| 5,391,335 A | 2/1995 | Sakamoto et al. | |
| 5,422,053 A | 6/1995 | Sterzel | |
| 5,437,924 A | 8/1995 | Decker, III et al. | |
| 5,439,947 A | 8/1995 | Bartlett et al. | |
| 5,447,962 A * | 9/1995 | Ajioka et al. | 521/79 |
| 5,478,494 A | 12/1995 | Lee et al. | |
| 5,532,284 A * | 7/1996 | Bartlett et al. | 521/134 |
| 5,563,180 A | 10/1996 | Skowronski et al. | |
| 5,565,497 A | 10/1996 | Godbey et al. | |
| 5,699,946 A | 12/1997 | Hashimoto et al. | |
| 5,736,586 A | 4/1998 | Bastioli et al. | |
| 5,750,584 A | 5/1998 | Knaus | |
| 5,759,569 A | 6/1998 | Hird et al. | |
| 5,763,518 A | 6/1998 | Gnatowski et al. | |
| 5,780,521 A | 7/1998 | Shmidt et al. | |
| 5,786,401 A | 7/1998 | Inagaki et al. | |
| 5,853,848 A | 12/1998 | Fisk | |
| 5,912,279 A | 6/1999 | Hammel et al. | |
| 5,922,348 A | 7/1999 | Wegner et al. | |
| 5,965,231 A | 10/1999 | Rotermund et al. | |
| 6,080,798 A | 6/2000 | Handa et al. | |
| 6,136,875 A | 10/2000 | Wu et al. | |
| 6,184,261 B1 | 2/2001 | Biby et al. | |
| 6,310,112 B1 | 10/2001 | Vo et al. | |
| 6,315,932 B1 | 11/2001 | Fujiwara et al. | |
| 6,355,341 B1 | 3/2002 | Chaudhary et al. | |
| 6,355,701 B1 | 3/2002 | Soukup et al. | |
| 6,476,080 B2 | 11/2002 | Duffy et al. | |
| 6,521,675 B1 | 2/2003 | Wu et al. | |
| 6,526,764 B1 | 3/2003 | Singh et al. | |
| 6,569,912 B1 | 5/2003 | Oohara et al. | |
| 6,599,946 B2 | 7/2003 | Duffy et al. | |
| 6,696,504 B1 | 2/2004 | Hayashi et al. | |
| 6,710,135 B2 | 3/2004 | Tan et al. | |
| 6,740,731 B2 | 5/2004 | Bigg et al. | |
| 6,753,357 B2 | 6/2004 | Kalinowski et al. | |
| 6,762,212 B2 | 7/2004 | Oohara et al. | |
| 6,841,581 B2 | 1/2005 | Hayashi et al. | |
| 7,045,556 B2 | 5/2006 | Handa et al. | |
| 7,166,248 B2 | 1/2007 | Francis et al. | |
| 7,358,282 B2 | 4/2008 | Krueger et al. | |
| 2002/0198273 A1 | 12/2002 | Nyberg et al. | |
| 2003/0078312 A1 | 4/2003 | Hibino et al. | |
| 2003/0114549 A1 | 6/2003 | Kalinowski et al. | |
| 2004/0006149 A1 | 1/2004 | Handa et al. | |
| 2004/0024077 A1 | 2/2004 | Braun et al. | |
| 2004/0132844 A1 | 7/2004 | Francis et al. | |
| 2005/0131094 A1 | 6/2005 | Kalinowski et al. | |
| 2005/0154114 A1* | 7/2005 | Hale | 524/436 |
| 2006/0047009 A1 | 3/2006 | Handa et al. | |
| 2006/0052464 A1 | 3/2006 | Handa et al. | |
| 2006/0052465 A1 | 3/2006 | Handa et al. | |
| 2006/0052466 A1 | 3/2006 | Handa et al. | |
| 2006/0091576 A1* | 5/2006 | Takase et al. | 264/51 |
| 2006/0167122 A1* | 7/2006 | Haraguchi et al. | 521/60 |
| 2007/0004813 A1 | 1/2007 | Shelby et al. | |
| 2008/0146686 A1 | 6/2008 | Handa | |
| 2009/0012194 A1 | 1/2009 | Okuda et al. | |
| 2009/0234035 A1 | 9/2009 | Cheung et al. | |

FOREIGN PATENT DOCUMENTS

| | | |
|---|---|---|
| DE | 4230097 | 5/1994 |
| DE | 198 24 134 | 12/1999 |
| EP | 0493110 | 7/1992 |
| EP | 1975195 | 10/2008 |
| FR | 2264840 | 10/2005 |
| JP | 6041344 | 2/1994 |
| JP | 2006328318 | 12/2006 |
| JP | 2006348060 | 12/2006 |
| KR | 185251 | 12/1998 |
| WO | WO91/13966 | 9/1991 |
| WO | WO9502000 | 1/1995 |
| WO | WO2004/005382 | 1/2004 |
| WO | WO2007083705 | 7/2007 |
| WO | WO2008098888 | 8/2008 |

OTHER PUBLICATIONS

U.S. Appl. No. 12/048,467, filed Mar. 14, 2008, Cheung, Yunwa Wilson; Dobreski, David V.; Turner, Richard; Wheeler, Mark.

Mohamed et al., "Polycaprolactone/polystyrene bioblends characterized by thermogravimetry, modulated differential scanning calorimetry and infrared photoacoustic spectroscopy," Polymer Degradation and Stability, vol. 92, Issue 7, Jul. 2007, pp. 1177-1185.

de Carvalho et al., "Polyhydroxybutyrate/acrylonitrile-g-(ethylene-co- propylene-co-diene)-g-styrene blends: Their morphology and thermal and mechanical behavior," Journal of Applied Polymer Science, vol. 110 Issue 2, pp. 880-889, Jul. 10, 2008.

U.S. Appl. No. 11/677,371, filed Feb. 21, 2007.
U.S. Appl. No. 11/680,170, filed Feb. 28, 2007.
U.S. Appl. No. 10/934,832, filed Sep. 3, 2004.
U.S. Appl. No. 11/016,312, filed Dec. 17, 2004.
U.S. Appl. No. 11/122,158, filed May 3, 2005.
U.S. Appl. No. 11/151,814, filed Jun. 13, 2005.
U.S. Appl. No. 11/367,652, filed Mar. 3, 2006.
U.S. Appl. No. 12/364,038, filed Feb. 2, 2009.
U.S. Appl. No. 12/048,467, filed Mar. 14, 2008.
U.S. Appl. No. 11/677,371, Non-Final Rejection mailed on Jan. 26, 2010.
U.S. Appl. No. 11/677,371, Response to Non-Final Rejecti/on mailed on Apr. 30, 2009 filed Jul. 30, 2009.
U.S. Appl. No. 11/677,371, Non-Final Rejection mailed on Apr. 30, 2009.
U.S. Appl. No. 11/677,371, Request for Continued Examination filed on Mar. 24, 2009.
U.S. Appl. No. 11/677,371, Final Rejection mailed on Dec. 24, 2008.
U.S. Appl. No. 11/677,371, Response to Non-Final Rejection mailed on Jun. 24, 2008 filed Sep. 4, 2008.
U.S. Appl. No. 11/677,371, Non-Final Rejection mailed on Jun. 24, 2008.
U.S. Appl. No. 10/934,832, Respnse to Non-Final Rejection mailed on Apr. 17, 2007 filed on Jul. 17, 2007.
U.S. Appl. No. 10/934,832, Non-Final Rejection mailed on Apr. 17, 2007.
U.S. Appl. No. 10/934,832, Request for Continued Examination filed on Feb. 6, 2007.
U.S. Appl. No. 10/934,832, Final Rejection mailed on Aug. 10, 2006.
U.S. Appl. No. 10/934,832, Response to Non-Final Rejection mailed on Mar. 3, 2006 filed on Jun. 5, 2006.
U.S. Appl. No. 10/934,832, Non-Final Rejection mailed on Mar. 3, 2006.
U.S. Appl. No. 10/934,832, Response to Non-Final Rejection mailed on Sep. 28, 2005 filed on Dec. 12, 2005.
U.S. Appl. No. 10/934,832, Non-Final Rejection mailed on Sep. 28, 2005.
U.S. Appl. No. 11/016,312, Certificate of Correction—Post Issue mailed on May 5, 2008.

U.S. Appl. No. 11/016,312, Request for Certificate of Correction—Post Issue filed on Feb. 6, 2008.
U.S. Appl. No. 11/016,312, Amendment after Notice of Allowance filed Oct. 30, 2007.
U.S. Appl. No. 11/016,312, Response to Non-Final Rejection mailed on Mar. 28, 2007 filed on Jul. 30, 2007.
U.S. Appl. No. 11/016,312, Response to Notice of Non-Compliant or Non-Responsive Amendment mailed on Dec. 5, 2006 filed on Jan. 2, 2007.
U.S. Appl. No. 11/016,312, Notice of Non-Compliant or Non-Responsive Amendment mailed on Dec. 5, 2006.
U.S. Appl. No. 11/016,312, Amendment After Final filed on Sep. 28, 2006.
U.S. Appl. No. 11/016,312, Request for Continued Examination filed on Sep. 15, 2006.
U.S. Appl. No. 11/016,312, Amendment After Final filed on Jun. 16, 2006.
U.S. Appl. No. 11/016,312, Final Rejection mailed on Mar. 16, 2006.
U.S. Appl. No. 11/016,312, Response to Non-Final Rejection mailed on Sep. 28, 2005 filed on Dec. 29, 2005.
U.S. Appl. No. 11/016,312, Non-Final Rejection mailed on Sep. 28, 2005.
U.S. Appl. No. 11/122,158, Non-Final Rejection mailed on Oct. 10, 2007.
U.S. Appl. No. 11/151,814, Non-Final Rejection mailed on Jan. 4, 2008.
U.S. Appl. No. 11/367,652, Non-Final Rejection mailed on Mar. 13, 2009.
U.S. Appl. No. 11/680,170, Non-Final Rejection mailed on Dec. 14, 2009.
U.S. Appl. No. 12/364,038, Final Rejection mailed on Mar. 24, 2010.
U.S. Appl. No. 12/364,038, Response to Non-Final Rejection mailed Dec. 21, 2009 filed Jan. 21, 2010.
U.S. Appl. No. 12/364,038, Non-Final Rejection mailed Dec. 21, 2009.
U.S. Appl. No. 12/364,038, Request for Continued Examination filed on Oct. 15, 2009.
U.S. Appl. No. 12/364,038, Response to Non-Final Rejection mailed Jun. 9, 2009 filed Jul. 22, 2009.
Cellular Materials, Encyclopedia of Polymer Science and Technology, J. Wisley and Sons, Article online, copyright 1999-2005.
International Search Report for PCT/US2007/062492, filed Feb. 21, 2007, International Searching Authority, Alexandria, Virginia, Sep. 18, 2008.
Narayan Ramani, "Biobased & Biodegradable Plastics 101," Chemical Engineering & Materials Science. 2010.
Nangeroni J. (Oct. 2007). Foam Extrusion and Thermoforming of NatureWorks® BioPolymer. Presented at Polymer Foams 2007, organized by Applied Market Information LLC, Newark, NJ.
Flieger M et al., "Biodegradable Plastics from Renewable Sources," Folia Microbiol. (2003);48(1):27-44.
Cereplast unveils breakthrough bio-based formable resin, Jun. 22, 2009, www.plastemart.com.
U.S. Appl. No. 12/364,038, Non-Final Rejection mailed Jun. 9, 2009.
U.S. Appl. No. 11/016,312, Non-Final Rejection mailed on Mar. 28, 2007.
U.S. Appl. No. 12/364,038, Amendment after Non-Final Rejection filed Aug. 5, 2010.
U.S. Appl. No. 11/680,170, Response to Restriction Election Requirement mailed on Jun. 24, 2010 filed on Jul. 21, 2010.
U.S. Appl. No. 11/680,170, Restriction Election Requirement mailed on Jun. 24, 2010.
U.S. Appl. No. 12/048,467, Non-Final Rejection mailed Jul. 23, 2010.
U.S. Appl. No. 11/677,371, Final Rejection mailed Jul. 21, 2010.

* cited by examiner though not to completely eliminate the use of such hydrocarbon or halogenated hydrocarbon blowing agents in the manufacture of biodegradable polymer foams.

EXPANDED AND EXTRUDED BIODEGRADABLE AND REDUCED EMISSION FOAMS MADE WITH METHYL FORMATE-BASED BLOWING AGENTS

CROSS REFERENCE TO RELATED APPLICATIONS

This application claims the benefit under 35 U.S.C. §119 (e) of U.S. provisional patent application No. 60/869,932 filed on Dec. 14, 2006, the entirety of the disclosure of which is explicitly incorporated by reference herein.

FIELD OF INVENTION

The present invention relates generally to foams made from biodegradable polymers and environmentally benign blowing agents, and processes of making the same. Particularly, the present invention relates to biodegradable and reduced emission stable foams made from biodegradable polymers that undergo hydrolytic decomposition or biodegradation, using methyl formate-based blowing agents, and processes of making the same. The biodegradable polymer foams serve as environmentally friendly replacements in applications where foams made from petroleum-derived polymers are traditionally used.

BACKGROUND OF THE INVENTION

Presently, foams used in packaging, protective, and insulating materials are made from oil and natural gas derived thermoplastics such as alkenyl aromatic polymers (e.g., polystyrene) or polyolefins (e.g. polyethylene and polypropylene). Such polymers, designated herein "conventional polymers" or "conventional plastics," do not undergo biodegradation and become a fixture of landfills and litter. On the other hand, biodegradable polymers are thermoplastics that are easily melt processed just like the conventional thermoplastics, but with the added attribute that they undergo hydrolytic decomposition or biodegradation in aerobic (such as composts) and anaerobic (such as landfills) environments where microbes break down the polymer to give primarily methane, carbon dioxide, organic residue called humus, and water. Biodegradable polymers can be made from petrochemical feedstock or, alternatively, from renewable biomass such as, for example, corn, sugarcane, wood, switchgrass or soybeans. Petrochemical based biodegradable polymers include, for example, various polyesters such as Biomax and Ecoflex. Biomass based polymers, also known as biopolymers, include, for example, polymers containing hydroxy acids such as polylactide or their esters such as polyhydroxyalkanoates. It should be noted, however, that not all biopolymers are biodegradable, and not all petroleum based polymers are non-biodegradable.

Recently, the advent of biomass derived polymers has shown that biodegradable thermoplastics having properties similar to those of conventional plastics can be prepared on a commercial scale. If means can be found to further improve the properties of biodegradable polymers (e.g. mechanical strength, elongational viscosity, stability over a wide temperature range, compatibility with conventional and other biodegradable polymers, etc.) then, by replacing conventional polymers with biodegradable polymers, the environmental aspects of solid plastic waste can be largely mitigated and, for certain applications, can be completely eliminated. The biodegradable foams can be used for various packaging applications where foams made from conventional polymers are currently employed.

Foams are commonly manufactured as expanded beads, extruded sheets, or extruded boards. The difference between the expanded and extruded foams is that the extruded foams, in the form of continuous sheets or boards, are made in a single-step process; whereas, expanded foams, in the form of discrete, small-size pieces, are made in a multi-step process. Thus, the dimensions of expanded foam are much smaller than those of extruded foam. Furthermore, the expanded foams do not necessarily have to be in the form of beads or peanuts, but can also be made from pellets, rods, platelets, thin sheet or film. For the sake of convenience, the term "bead" or "pellets" will be used throughout this application to imply other shapes in which small, discrete particles of the polymer resin can be used to make expanded foams.

Generally, foams in the form of beads or sheets having a thickness of less than about one-half inch can be used to make packaging materials such as containers (e.g. cups, bowls, clamshells, picnic chests) for hot or cold beverages or food whereby the beads are fused or the sheet is thermoformed in a mold to form the packaging material of a desired shape. Such foams are also used as protective and cushioning materials for transportation of delicate or shock sensitive articles whereby the foam beads can be used as loose fill dunnage material and thin sheets can be used to provide protective wrapping.

Packaging and insulation foam products with a thickness greater than about 0.5 inch are called planks or boards. Such foam boards are produced in the desired shape and size by direct extrusion and cutting if needed, or by fusing the expanded foam beads. The foam boards can be used for protective packaging by die-cutting the boards to various shapes, for insulation, for dissipating mechanical energy as in automotive parts, or for cushioning floats. It is desirable that the foams used in such diverse applications be dimensionally stable; this characteristic is even more desirable for planks or boards.

Polymer foams are commonly made using a continuous process where a blowing agent laden molten resin is extruded under pressure through an appropriate die into a lower pressure atmosphere. Alternatively, a batch or staged process can be used, where small polymer beads (also called particles or pellets) are impregnated with blowing agent and then expanded by heating rapidly to a temperature near or above the glass-transition or crystal-melt temperature of the polymer-blowing agent system, or subjected to an external compressive stress at a temperature up to the glass-transition or crystal-melt temperature of the polymer-blowing agent system. Presently, physical blowing agents more commonly used for making thermoplastic polymer foams are hydrocarbons, chlorinated hydrocarbons, hydrochlorofluorocarbons, hydrofluorocarbons, or combinations thereof. Hydrocarbons with three or more carbon atoms are considered volatile organic compounds (VOCs) that can lead to formation of smog. Furthermore, some halogenated hydrocarbons are either VOCs or may have high ozone depletion potential (ODP) or global warming potential (GWP), or may be hazardous air pollutants (HAPs) and, at times, may fall into more than one of these categories. Therefore, the use of hydrocarbon and halogenated hydrocarbon blowing agents for preparing polymeric foams is not preferred environmentally and imposes many limitations on the manufacturing process, thus complicating and significantly increasing the cost of manufacturing. In efforts to make biodegradable polymer foams (beads or sheets), the conventionally used blowing agents, such as VOCs, have been the obvious choice, albeit such uses are associated with the same environmental concerns as noted above. It is therefore desirable to minimize or eliminate altogether the use of such compounds as blowing agents for preparing biodegradable polymer foams.

Methyl formate is classified as a non-VOC (Federal Register, Volume 69, Number 228, Nov. 29, 2004), is non-HAP, has zero ODP, and negligible GWP. U.S. Pat. No. 6,753,357 to Kalinowski et al., describes the use of methyl formate to produce stable, rigid isocyanate/polyol based polyurethane foams. It is noted, however, that such polyurethane foams are thermoset, so as to be made via a cross-linking and curing process. The dimensional stability or instability imparted to the final polyurethane foam product by the nature of the blowing agent therefore is quite different than in the case of thermoplastic polymer foams.

U.S. Pat. No. 3,358,060 to Ohsol, which is incorporated in its entirety herein by reference thereto, is directed to a process for forming foam bodies with a thickness of up to four inches, by premixing polymer pellets with a minor amount of absorbent, which has been charged with the desired amount of foaming agent, and then melt extruding the mixture in the conventional way. Ohsol describes that any conventional absorbent can be used to entrap or hold the volatile liquid (i.e., the foaming agent). Alternatively, to avoid use of the absorbent, Ohsol describes a method in which polymer beads impregnated with the volatile liquid are fed into the extruder to produce thick foam bodies. A number of volatile liquids, including methyl formate, are proposed as foaming agents. Ohsol discloses that suitable thermoplastic resins include cellulose ethers and esters, for example, ethyl cellulose and cellulose acetate. The extruded foam body from Ohsol's process tends to develop surface irregularities and corrugated surfaces, which require further processing. Accordingly, Ohsol discloses removing a portion of the surface of the extruded board, which contains the surface irregularities or corrugated surface, with a cutting member. While cutting the surface of the board may remove any surface irregularities, one drawback is that it also creates a large number of open cells on the surface of the board.

U.S. Pat. No. 3,085,073 to Lintner et al., which is incorporated in its entirety herein by reference thereto, discloses the production of a heat expandable thermoplastic resin in granular form via a diffusion/solvent washing technique using a blowing agent mixture. The blowing agent mixture comprises a solvent blowing agent, such as methyl formate, and a non-solvent blowing agent, such as pentane, with the requirement that the solvent and non-solvent components be miscible. The process requires the step of extracting the solvent blowing agent with a suitable liquid solvent such that the amount of solvent blowing agent is reduced to less than two weight percent, without affecting the amount of non-solvent blowing agent in the granules. The impregnation and extraction of blowing agents are carried out at room temperature or at a temperature below the glass transition temperature of the polymer.

U.S. Pat. No. 5,422,053 to Sterzel, which is incorporated in its entirety herein by reference thereto, is directed to a process for injection molding foamed parts, which include polylactide. The process includes melt extruding and then pelletizing a mixture of polylactide and 10 to 30 percent by weight of a solvent, such as methyl formate, followed by drying the pellets at room temperature and allowing the polylactide to crystallize. Alternatively, the crystalline polylactide pellets are obtained by mixing the pellets with the solvent at room temperature and allowing sufficient time for the solvent to diffuse into the pellets. The solvent-laden polylactide pellets are then fed into an injection-molding machine to make the foamed part. U.S. Pat. No. 5,348,983 to Sterzel, which is incorporated in its entirety herein by reference thereto, is directed to rigid polylactide moldings obtained by fusing foamed amorphous polylactide granules with finely divided, unfoamed, semi-crystalline polylactide particles. The unfoamed polylactide particles are devoid of any blowing agent.

Therefore, a need exists not only to make thermoplastic foams with minimum or no impact on air quality and which minimize the accumulation of solid waste on our planet, but also to produce these thermoplastic foams efficiently. Thus, environmentally benign polymers which undergo biodegradation and do not contribute to solid waste, and blowing agents employing methyl formate and environmentally friendly co-blowing agents, preferably non-VOC co-blowing agents, as components of the blowing agent blend, provide the necessary ingredients to produce stable biodegradable and low-emission polymeric foams.

SUMMARY OF THE INVENTION

The present invention relates to biodegradable and reduced emission stable foams made from polymers that undergo hydrolytic decomposition or biodegradation, using methyl formate-based blowing agents, and processes of making the same. Two environmental impacts associated with foam manufacturing and foam products are air emissions and solid waste, respectively. By partly or completely replacing conventional (i.e., non-biodegradable) polymers with those that readily undergo biodegradation under aerobic and/or anaerobic conditions, and by employing blowing agents containing environmentally benign non-VOC and non-HAP species, the environmental aspects of air emissions and solid waste can be largely mitigated and, for certain applications, can be completely eliminated. The polymers and blowing agents of the present invention, and the foams made therefrom, thus offer significant advantages as compared with the current state of the art.

In accordance with the present invention, a preferred blowing agent for making biodegradable polymeric foams is methyl formate. The blowing agent can be a blend further including at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, or any combination thereof), a chemical co-blowing agent, or combinations thereof. The biodegradable foam can be an expanded foam structure or an extruded foam structure, either of which can be used as packaging, protective, and insulation foams. The blowing agent can be 100% methyl formate, or the blowing agent can be a blend including any combination of methyl formate and one or more co-blowing agents. The preferred co-blowing agent is an inorganic agent such as carbon dioxide, water, nitrogen, argon; a hydrocarbon, more preferably a hydrocarbon containing two to five carbon atoms such as ethane, propane, n-butane, isobutane, isopentane; a halogenated hydrocarbon such as 1,1-difluoroethane (HFC-152a), 1,1,1,2-tetrafluoroethane (HFC-134a), trans-1,2-dichloroethylene, 1,1,1,3,3-pentafluoropropane (HFC-245fa); an ether such as dimethyl ether; or any combination thereof.

In accordance with one embodiment, an expandable biodegradable formulation is used to prepare a biodegradable polymer foam structure, which can be either an expanded or an extruded foam structure. The formulation includes a biodegradable polymer and a blowing agent, the blowing agent including methyl formate. The biodegradable polymer can be poly(lactic acid), also called polylactide (PLA), poly(glycolic acid) (PGA), poly(lactide-co-glycolide) (PLGA), poly(caprolactone) (PCL), poly(ethylene glycol) (PEG), poly(hydroxy alkanoates) (PHA) such as polyhydroxybutyrate (PHB), polyhydroxybutyrate-co-hydroxyvalerate (PHBV), poly(butylenesuccinate) (PBS), poly(butylenesuccinate-adipate) (PBSUA) and poly(propylene fumarate) (PPF); Hybrane, Biomax, Ecoflex, cellulosics with varying degree of acetylation such as cellulose acetate or cellulose triacetate, a starch (derived from, e.g., corn, wheat, rice, potato, tapioca, or other renewables) and containing varying proportions of amylose and amylopectin or derivative thereof such as acetylated starch, co-polymers of PLA with other biodegradable polymers such as a co-polymer of PLA and Ecoflex called Ecovio, or a combination thereof. The biodegradable polymers or their blends can be further blended with conventional (non-biodegradable) thermoplastics such as alkenyl aromatic polymers (e.g. polystyrene), acrylics (e.g., polymethyl methacrylate), polyolefins (e.g. polyethylene, polypropylene), etc. Suitable compatibilizers such as poly(vinyl acetate), maleic anhydride grafted conventional thermoplastic, molecules or macromolecules containing the moieties acrylates or isocyanates can be used to homogenize the blend and improve its melt strength. Generally, the compatibilizer should have at least two parts, one of which is miscible with the biodegradable polymer and the other with the conventional polymer in order to give a homogeneous and miscible blend. The melt strength of the blend can also be improved via light cross-linking using poly(sulfonyl azide), organic peroxides, radiation, and other cross-linking agents known in the art. Biodegradable additives such as Isosorbide can also be added to augment the melt strength. In accordance with one embodiment of the invention, the biodegradable polymer includes semi-crystalline or amorphous PLA or PHA and its blends with other biodegradable polymers or conventional polymers. In a preferred embodiment, the biodegradable polymer includes PLA or PHA and its blends with other biodegradable polymers.

In accordance with another embodiment, a biodegradable polymeric foam structure is prepared from an expandable biodegradable polymeric formulation including a biodegradable polymer and a blowing agent, the blowing agent including methyl formate. In one aspect of this embodiment, the biodegradable polymeric foam structure is prepared by melting a biodegradable polymer, mixing (e.g., dissolving, impregnating or entrapping) an effective amount of blowing agent, and extruding the compressed mixture through an appropriate die into a low pressure zone to form a foam sheet or a board, or into a low temperature zone at a quench temperature to form expandable beads. In another aspect of this embodiment, the expandable beads are prepared by dissolving an effective amount of blowing agent into the biodegradable polymer. In a further aspect, the expandable beads are prepared by synthesizing the polymer in the presence of the blowing agent so as to dissolve, impregnate or entrap the blowing agent in the polymer. The polymer can be in the form of pellets, preferably of size about 0.05 inch×0.05 inch, beads or particles. The expanded foam structure is then obtained by rapidly heating the expandable formulation to a temperature near or above the glass-transition or crystal-melt temperature of the polymer-blowing agent system, to form foamed beads, which can be used as such or further compression molded into desired shapes and thickness. In yet another further aspect, the expanded foam structure is obtained by subjecting the beads to an external compressive stress at a temperature up to the glass-transition or crystal-melt temperature of the polymer-blowing agent system.

According to a process of the present invention, a biodegradable polymeric foam structure is prepared from an expandable biodegradable polymeric formulation including a biodegradable polymer and a blowing agent, the blowing agent including methyl formate. In one aspect of this embodiment, the process includes melting a biodegradable polymer, mixing (e.g., dissolving, impregnating or entrapping) an effective amount of blowing agent, and extruding the compressed mixture through an appropriate die into a low pressure zone to form a foam sheet or a board, or into a low temperature zone at a quench temperature to form expandable beads. In another aspect of this embodiment, the expandable beads are prepared by dissolving an effective amount of blowing agent into the polymer. In a further aspect, the expandable beads are prepared by synthesizing the polymer in the presence of the blowing agent so as to dissolve, impregnate or entrap the blowing agent in the polymer. The polymer can be in the form of pellets, preferably of size about 0.05 inch×0.05 inch, beads or particles. The expanded foam structure is then obtained by rapidly heating the expandable formulation to a temperature near or above the glass-transition or crystal-melt temperature of the polymer-blowing agent system, to form foamed beads, which can be used as such or further compression molded into desired shapes and thickness. In yet another further aspect, the expanded foam structure is obtained by subjecting the beads to an external compressive stress at a temperature up to the glass-transition or crystal-melt temperature of the polymer-blowing agent system.

In accordance with another embodiment of the invention, the foam structure can be laminated with a film of solid, unfoamed polymer, where the polymer comprising the film can be the same polymer as that comprising the foam structure or a different polymer. In accordance with one embodiment of the invention, the film/foam composite foam structure includes a biodegradable foam structure and a film coating, where the polymer comprising the film can be a non-biodegradable thermoplastic polymer, a biodegradable polymer or a combination thereof. In accordance with yet another embodiment of the invention, the film/foam composite structure includes a non-biodegradable foam structure and a film coating, where the polymer comprising the film can be a biodegradable polymer, a non-biodegradable polymer or a combination thereof.

The biodegradable polymer used in accordance with the present invention, can be poly(lactic acid), also called polylactide (PLA), poly(glycolic acid) (PGA), poly(lactide-co-glycolide) (PLGA), poly(caprolactone) (PCL), poly(ethylene glycol) (PEG), poly(hydroxy alkanoates) (PHA) such as polyhydroxybutyrate (PHB), polyhydroxybutyrate-co-hydroxyvalerate (PHBV), poly(butylenesuccinate) (PBS), poly(butylenesuccinate-adipate) (PBSUA) and poly(propylene fumarate) (PPF); Hybrane, Biomax, Ecoflex, cellulosics with varying degree of acetylation such as cellulose acetate or cellulose triacetate, a starch (derived, e.g., from corn, wheat, rice, potato, tapioca, or other renewables) and containing varying proportions of amylose and amylopectin or derivative thereof such as acetylated starch, co-polymers of PLA with other biodegradable polymers such as a co-polymer of PLA and Ecoflex called Ecovio, or a combination thereof. The biodegradable polymers or their blends can be further blended with conventional (non-biodegradable) thermoplastics such as alkenyl aromatic polymers (e.g. polystyrene), acrylics (e.g., polymethyl methacrylate), polyolefins (e.g. polyethylene, polypropylene), etc. Suitable compatibilizers such as poly(vinyl acetate), maleic anhydride grafted conventional thermoplastic, molecules or macromolecules containing the moieties acrylates or isocyanates can be used to homogenize the blend and improve its melt strength. Generally, the compatibilizer should have at least two parts, one of which is miscible with the biodegradable polymer and the other with the conventional polymer in order to give a homogeneous and miscible blend. The melt strength of the blend can also be improved via light cross-linking using poly(sulfonyl azide), organic peroxides, radiation, and other cross-linking agents known in the art. Biodegradable additives such as Isosorbide can also be added to augment the melt strength. In accordance with one embodiment of the invention, the biodegradable polymer includes semi-crystalline or amorphous PLA or PHA and its blends with other biodegradable polymers or conventional polymers. In a preferred embodiment, the biodegradable polymer includes PLA or PHA and its blends with other biodegradable polymers.

The biodegradable polymeric foam structure obtained by the process of the present invention preferably is a substantially closed-cell and dimensionally-stable structure. The polymers and blowing agents of the present invention, and the biodegradable and low emission foams made therefrom, offer significant advantages as compared with the current state of the art.

Figure 1:
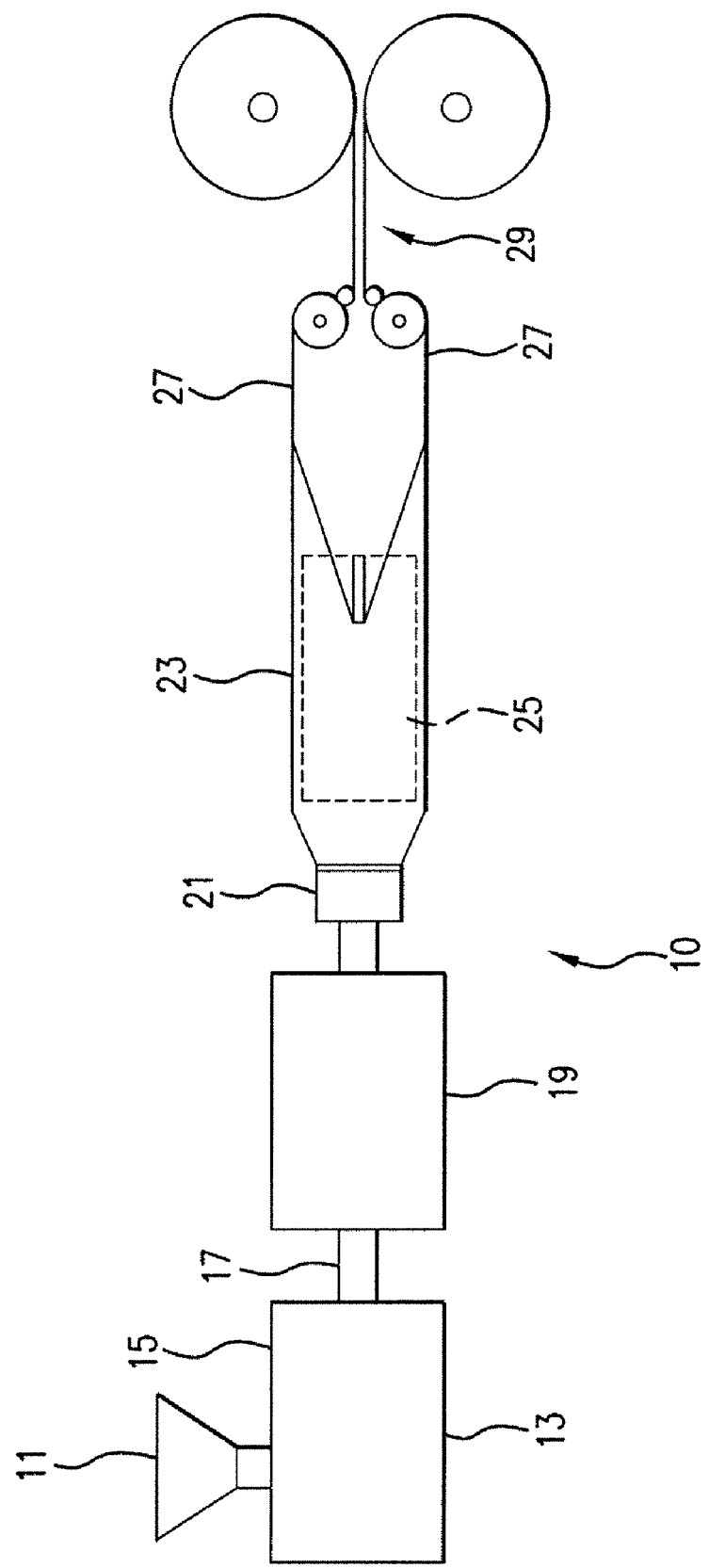
FIG. 1 is a schematic flow diagram of an overall sequence of operations involved in the manufacture of an extruded foam sheet according to one embodiment of the present invention.

While the invention is capable of various modifications and alternative forms, specific embodiments thereof have been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Reference will now be made in detail to the present preferred embodiments of the invention, an example of which is illustrated in the accompanying drawings. The method and corresponding steps of the invention will be described in conjunction with the detailed description of the compositions.

The methods and compositions presented herein may be used for the manufacture of foam beads, sheets, boards or planks. The present invention is particularly suited for a blowing agent composition having reduced ozone formation or depletion potential and negligible global warming potential.

In accordance with the present invention, stable thermoplastic foams are achieved using blowing agents that are environmentally benign.

The effectiveness of a blowing agent depends on its solubility in the polymer and its ability to expand the polymer-blowing agent solution when such a solution is subjected to thermodynamic instability such as, for example, when the solution exits a die attached to an extruder (to provide the extrudate) or when the blowing agent laden polymer is rapidly heated. The expansion of the polymer-blowing agent solution depends on the difference between the glass transition temperature of the polymer Tg and the boiling point of the blowing agent Tb. In general, the solubility of the blowing agent in the polymer depends on the difference between Tg and Tb (Tg–Tb); the smaller the difference the higher the solubility. In the case of semi-crystalline polymers such as certain biodegradable polymers, the characteristic temperature governing expandability is the crystal melting temperature Tm, and that governing blowing agent solubility is (Tm–Tb). Since volatility follows an inverse relationship with Tb, it is understood that at the same conditions of temperature and pressure, a higher volatility blowing agent will have lower solubility compared to a lower volatility blowing agent.

As such, by blending a lower volatility blowing agent with a higher volatility blowing agent, a foaming formulation with optimized solubility and expandability characteristics can be developed. Furthermore, by blending a currently used VOC or HAP blowing agent with a non-VOC and non-HAP blowing agent of similar volatility, the emissions can be reduced without sacrificing the solubility and expandability characteristics. By using biodegradable polymers, the environmental impact of waste accumulation can be reduced or, in some cases, eliminated.

The foams and processes of the present invention employ blowing agent(s) to achieve a stable biodegradable polymer foam. The preferred blowing agent used in the present invention includes methyl formate, which is non-VOC and non-HAP, and has zero ODP and negligible GWP. Hence, eliminating HAPs and minimizing the propensity to smog formation from the manufacturing process and the foam resulting therefrom is not only environmentally friendly, but also avoids many of the disadvantages of certain blowing agent compositions and processes currently employed. Thus, methyl formate alone or in combination with one or more suitable blowing agents having similar environmental attributes can help offset the harmful environmental impacts (ODP, HAP, VOC, GWP) associated with the blowing agents in current use.

Resins that can be foamed in accordance with the present invention include biodegradable polymers, which readily undergo hydrolytic decomposition or biodegradation in aerobic (such as composts) and anaerobic (such as landfills) environments where microbes break down the biodegradable polymers to give primarily methane, carbon dioxide, and water. Suitable biodegradable polymers include, but are not limited to, poly(lactic acid), also called polylactide (PLA), poly(glycolic acid) (PGA), poly(lactide-co-glycolide) (PLGA), poly(caprolactone) (PCL), poly(ethylene glycol) (PEG), poly(hydroxy alkanoates) (PHA) such as polyhydroxybutyrate (PHB), polyhydroxybutyrate-co-hydroxyvalerate (PHBV), poly(butylenesuccinate) (PBS), poly(butylenesuccinate-adipate) (PBSUA) and poly(propylene fumarate) (PPF), Hybrane (dendritic polymers with acidic, hydroxyl, and ester functional groups), modified polyesters such as Biomax and Ecoflex, cellulosics with varying degree of acetylation such as cellulose acetate or cellulose triacetate, a starch (derived from, e.g., corn, wheat, rice, potato, tapioca, or other renewables) and containing varying proportions of amylose and amylopectin or derivative thereof, co-polymers of PLA with other biodegradable polymers such as a co-polymer of PLA and Ecoflex called Ecovio, or a combination thereof. Examples of starch derivatives include, but are not limited to, acetylated starches, oxidised starches and hydroxy-propylated starches. Suitable foamable blends can be prepared from these and other polymers that are degradable to the extent specified by the manufacturer. The biodegradable polymers or their blends can be further blended with conventional (non-biodegradable) thermoplastics such as alkenyl aromatic polymers (e.g. polystyrene), acrylics (e.g., polymethyl methacrylate), polyolefins (e.g. polyethylene, polypropylene), etc. Suitable compatibilizers such as poly (vinyl acetate), maleic anhydride grafted conventional thermoplastic, molecules or macromolecules containing the moieties acrylates or isocyanates can be used to homogenize the blend and improve its melt strength. Generally, the compatibilizer should have at least two parts, one of which is miscible with the biodegradable polymer and the other with the conventional polymer in order to give a homogeneous and miscible blend. The melt strength of the blend can also be improved via light cross-linking using poly(sulfonyl azide), organic peroxides, radiation, and other cross-linking agents known in the art. Biodegradable additives such as Isosorbide can be also be added to augment the melt strength.

Conventional fortifiers such as nanoclays and nanofibers, cyclodextrins, zeolites (molecular sieves), and other supramolecular compounds can also be added to improve the mechanical and gas-barrier properties of the polymers and their blends.

The biodegradable polymers and biodegradable additives can also be blended with conventional (i.e., non-biodegradable) polymers such as alkenyl aromatic polymers (e.g., polystyrene), acrylics (e.g., polymethyl methacrylate), and polyolefins (e.g., polyethylene, polypropylene) to provide formulations with desirable rheological and mechanical properties. Foams made from such compositions will be degradable to the extent of the biodegradable component(s) in the formulation. Furthermore, the biodegradation kinetics may be affected by the presence of conventional plastics. It should be noted that most biodegradable plastics are semi-crystalline. Whereas the amorphous fraction readily undergoes biodegradation, the kinetics for degradation of the crystalline fraction is less favorable. On the other hand, when blended with conventional polymers, the biodegradable polymer will most likely exist in the amorphous state only, thereby compensating for the slower kinetics in the blend. In accordance with one embodiment of the invention, the biodegradable polymer includes semi-crystalline or amorphous PLA or PHA and its blends with other biodegradable polymers or conventional polymers. In a preferred embodiment, the biodegradable polymer includes PLA or PHA and its blends with other biodegradable polymers. Regardless, given the long residence time of municipal solid waste (MSW) in the landfill (up to 30 years or more), biodegradable polymers will eventually be ingested by the microbes.

The presence of small amounts of polymers with high affinity for water such as PCL, PEG, Hybrane, cellulosics or starches, etc., in the formulations including blends of conventional and biodegradable polymers will help accelerate the degradation kinetics. On prolonged contact with water, such compositions will first experience swelling due to water absorption, followed by leaching out of the hydrophilic components. This will create voids and pathways for the microbes to reach the digestible portions of the blend with greater ease.

Conventional polymer resins that can be added to the biodegradable formulations include melt processable thermoplastic polymers such as alkenyl aromatic polymers, polyolefins, polycarbonates, polyacrylates, and others. The biodegradable component can vary from 1 to 100% of the polymer blend, depending on the properties desired for the end product.

The term "thermoplastic polymer" includes both amorphous and semi-crystalline polymers. Examples of amorphous thermoplastic polymers include but are not limited to polystyrene, polycarbonate, poly(methyl methacrylate), poly (phenyleneoxide), and poly(DL-lactic acid) also called poly (DL-lactide). Examples of semi-crystalline thermoplastic polymers include but are not limited to polyethylene, polypropylene, syndiotactic-polystyrene, poly(ethylene terephthalate), and poly(D- or L-lactic acid) also called poly (D- or L-lactide).

Polyolefinic polymers include homopolymers and blends thereof, copolymers of olefinic compounds and copolymerizable olefinic monomers. Most commonly used polyolefin polymers are based on ethylenic and/or propylenic moieties. The ethylenic polymer material can further include minor proportions of non-ethylenic polymers. The ethylenic polymer material can include, for example, solely one or more ethylenic homopolymers, one or more ethylenic copolymers, a blend of one or more of each of ethylenic homopolymers and copolymers, or blends of any of the foregoing with a non-ethylenic polymer. Regardless of composition, the ethylenic polymer material preferably includes greater than 50 weight percent, and more preferably greater than 70 weight percent of ethylenic monomeric units. Most preferably, the ethylenic polymer material is included completely of ethylenic monomeric units. Most preferred ethylenic polymers are polyethylene homopolymers. Polyethylenes can be of the high, medium, low, linear low, or ultra-low density type. Most preferred are low density polyethylenes. The polyethylenes can be linear, branched or cross-linked. Virgin polyethylene resin can be combined with recycled polyethylene from post-industrial or post-consumer sources or can be combined with offgrade virgin polyethylene.

Suitable ethylenic copolymers can be made up of ethylenic monomeric units and minor amounts, preferably 20 weight percent or less, of a monoethylenically unsaturated monomeric unit or units copolymerizable therewith. Suitable comonomers include $C_1$-$C_4$ alkyl acids and esters, ionomeric derivatives, $C_4$-$C_6$ dienes and $C_3$-$C_9$ olefins. Examples of suitable comonomers include, but are not limited to, acrylic acid, itaconic acid, maleic acid, methacrylic acid, ethacrylic acid, methyl acrylate, methyl methacrylate, ethyl acrylate, vinyl acetate, maleic anhydride, acrylonitrile, propylene, isobutylene, and butadiene.

Suitable propylenic polymer material that can be used in the present invention includes polypropylene homopolymer or copolymers. Propylene copolymers include random and block copolymers of propylene and an olefin such as ethylene, $C_4$-$C_{10}$ dienes, and random terpolymers of propylene with other non-propylenic, linear or branched 1-olefins. Propylene polymer may include one or more propylene homopolymer, one or more propylene copolymers, or co-polymerized with other olefinic monomers, a blend of one or more homopolymers and copolymers, or blends of any of the propylene polymer with non-propylene polymers such as polyethylenes, polybutylenes, olefinic rubbers, and ionomers. The propylene polymer content in such blends is preferably greater than 50 weight percent, more preferably greater than 75 weight percent, and a majority of the propylene polymer should be high melt strength polymer. Various polypropylene polymers that are suitable in the present invention include, but are not limited to, atactic, isotactic, syndiotactic, and long-chain branched polypropylenes. The polypropylenes can be linear, branched or cross-linked. The polypropylene resin can be further combined with suitable amounts of recycled polypropylene from post-consumer or post-industrial sources or with offgrade virgin polypropylene.

Similar considerations apply to olefinic polymers other than polyethylene or polypropylene, such as polyisobutylenes, poly(4-methyl-1-pentene) or polymers made from higher olefins, any one or more of which can be used in combination with the biodegradable polymer foam structures of the present invention.

The term "alkenyl aromatic polymer" includes polymers of aromatic hydrocarbon molecules that contain an aryl group joined to an olefinic group with only double bonds in the linear structure, such as styrene, or styrene homologs such as α-methylstyrene, o-, m- and p-methylstyrene, α-ethylstyrene, o-, m-, p-ethylstyrene, 2,4-dimethylstyrene, α-vinylxylene, vinyl toluene and the like. Alkenyl aromatic polymers also include homopolymers of styrene or styrene homologs (commonly referred to as polystyrene), copolymers of styrene, and rubber-toughened polystyrene (commonly referred to as high impact polystyrene, HIPS). With respect to a styrene copolymer, the comonomer generally can be any other ethylenically unsaturated material such as the conjugated 1,3-dienes, e.g., butadiene, isoprene, etc., alpha-beta-unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of a styrene polymer with other polymers can be employed, e.g., blends of a styrene polymer with polyphenylene oxide. Preferably, the copolymers contain a predominant portion of styrene, for example greater than about 50 weight percent styrene, and more preferably greater than 75 weight percent styrene.

One method of reducing the conventional plastics in the MSW or litter is to replace the solid plastic in a composite foam/film structure with solid biodegradable polymer(s). For example, the inner foam core in such a structure can be made from a conventional polymer and the laminate can be a biodegradable polymer or its blend with bioadditives. In such structures, the degradation kinetics of the biodegradable-component will not be affected by the presence of conventional plastics. Yet another embodiment includes preparing bead foams from the biodegradable polymers, followed by preparing the desired product by molding the pre-expanded beads. In another configuration, the conventional plastic beads can be pre-expanded and then coated with the biodegradable formulation before a molding operation. In all these composite structures, the biodegradable component can be varied from 1 to 100%, depending on the properties desired for the end product.

The blowing agent includes from about 1 weight percent to about 100 weight percent methyl formate. In one embodiment, the blowing agent includes 100 weight percent methyl formate. In another embodiment, however, the blowing agent is a blend including less than 100 weight percent methyl formate, and further including at least one co-blowing agent. It is contemplated that more than one co-blowing agent can be employed in the blowing agent blend. Such co-blowing agent(s) can be physical, chemical or combinations thereof. The composition of the blowing agent blend depends on the foamed structure being prepared. In one embodiment, when the foamed structure is a sheet, a board or plank, or expandable bead, the blowing agent blend includes from about 1 weight percent to about 100 weight percent methyl formate. In another embodiment, however, when the foamed structure is a sheet, a board or plank, or an expandable bead, the blowing agent blend includes from about 1 weight percent to about 99 weight percent methyl formate, and at least one co-blowing agent. Such co-blowing agent(s) can be physical, chemical or combinations thereof. The co-blowing agent generally is either fast expanding or has similar expansion characteristics as compared to pure methyl formate. The co-blowing agent can be an organic compound or an inorganic compound. Preferably, the co-blowing agent is a non-VOC. Some non-limiting examples of physical co-blowing agents include, but are not limited to, inorganic agents, organic agents (e.g. hydrocarbons, halogenated saturated or unsaturated hydrocarbons, ethers, esters, acetals, alkanols, carbonates, amines and ketones), or any combination thereof.

Some suitable inorganic physical blowing agents include, but are not limited to, carbon dioxide, water, air, nitrogen, argon, xenon, sulfur hexafluoride, nitrous oxide, ammonia, silicon tetrafluoride, nitrogen trifluoride, boron trifluoride, and boron trichloride, or any combination thereof. In one currently preferred embodiment, the inorganic agent is an inorganic gas such as carbon dioxide, nitrogen, argon, air and the like. A currently preferred inorganic gas is carbon dioxide. In another currently preferred embodiment, the inorganic agent is water.

Some examples of organic physical co-blowing agents that can be used in the present invention include, but are not limited to, hydrocarbons, halogenated hydrocarbons, fluids with polar groups such as ethers, esters, acetals, carbonates, alkanols, amines and ketones, and combinations thereof. Examples of hydrocarbons include, but are not limited to, methane, ethane, propane, cyclopropane, normal- or iso-butane, cyclobutane, neopentane, normal- or iso-pentane, and cyclopentane or any combination thereof. Examples of currently preferred halogenated saturated hydrocarbons include, but are not limited to, methyl fluoride, difluoromethane (HFC-32), trifluoromethane (HFC-23), perfluoromethane, chlorodifluoromethane (HCFC-22), methylene chloride, ethyl chloride, ethyl fluoride, 1,2-difluoroethane (HFC-152), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), pentafluoroethane (HFC-125), perfluoroethane, 1,1-dichloro-1-fluoroethane (HCFC-141b), 1-chloro-1,1-difluoroethane (HCFC-142b), 1,1-dichloro-2,2,2-trifluoroethane (HCFC-123), and 1-chloro-1,2,2,2-tetrafluoroethane (HCFC-124), isopropyl chloride, difluoropropane, 1,1,1-trifluoropropane, 1,1,1,3,3-pentafluoropropane (HFC-245fa), 1,1,1,2,3,3-hexafluoropropane (HFC-236ea), 1,1,1,2,3,3,3-heptafluoropropane (HFC-227ea), perfluoropropane, 2,2,4,4,4-pentafluorobutane (HFC-365mfc), perfluorobutane, perfluorocyclobutane, and vinyl fluoride, or any combination thereof. Examples of currently preferred halogenated unsaturated hydrocarbons include, but are not limited to, trans-1,2-dichloroethylene, 1,1,1,2-tetrafluoropropene, and 1,1,1,2,3-pentafluoropropene. Fluids with polar groups include but are not limited to ethers such as dimethyl ether, vinyl methyl ether, methyl ethyl ether, dimethyl fluoroether, diethyl fluoroether, and perfluorotetrahydrofuran; amines such as dimethylamine, trimethylamine and ethylamine; ketones such as acetone and perfluoroacetone; esters such as ethyl formate and methyl acetate; acetals such as methylal; carbonates such as dimethyl carbonate; alkanols such as ethanol and isopropanol, or any combination thereof.

Chemical co-blowing agents are compounds which undergo a chemical reaction, for example decomposition, to form an inorganic gas such as $CO_2$ or $N_2$ and CO. Non-limiting examples of suitable chemical co-blowing agents include azodicarbonamide, azodiisobutyronitrile, benzenesulfonylhydrazide, 4,4'-oxybis(benzene sulfonylhydrazide), p-toluene sulfonyl semicarbazide, barium azodicarboxylate, N,N'-dimethyl-N,N'-dinitrosoterephthalamide, trihydrazino triazine, and other azo, N-nitroso, carbonate, and sulfonyl hydrazides. There are also various acid/bicarbonate mixtures that decompose into gases when heated. For example, mixtures of citric acid and sodium bicarbonate sold under the name HYDROCEROL® can be employed as chemical co-blowing agents.

The total amount of the blowing agent in the polymeric formulation used to prepare the biodegradable foam structures depends on conditions such as temperature and pressure under which the blowing agent is dissolved in the polymer, the chemical and thermophysical characteristics of the blowing agent being used, and the desired density and associated properties such as insulation value, weight to strength ratio, compressive strength, etc. of the foamed article. The foaming or expandable formulation is defined herein as including the blowing agent(s), polymer resin(s), and any additives. For a foam having a density of from about 1 to about 15 lb/ft$^3$, the formulation typically includes from about 20 to about 1 weight percent of blowing agent. In one embodiment, when the foamed structure is obtained by melt extrusion, the formulation typically includes from about 18 to about 1 weight percent of blowing agent. In an alternative embodiment, however, when the foamed structure is an expandable bead, the formulation includes from about 18 to about 1 weight percent, preferably from about 10 to about 2 weight percent and more preferably from about 9 to about 3 weight percent of blowing agent.

The blowing agent used in the present invention includes 100% methyl formate, or the blowing agent can be a blend including 99 weight percent or less methyl formate in combination with one or more co-blowing agent(s), which can be a physical co-blowing agent, a chemical co-blowing agent, or a combination thereof. The blowing agent blend generally includes from about 1 weight percent to about 99 weight percent methyl formate, for example from about 5 weight percent to about 75 or 80 weight percent methyl formate, or from about 20 weight percent to about 80 weight percent methyl formate. The blowing agent blend more typically includes from about 20 or 25 weight percent to about 60 weight percent methyl formate. More specifically, the blowing agent blend preferably includes from about 20 or 25 weight percent to about 50 weight percent methyl formate.

If provided, the blowing agent blend generally includes at least about 20 or 25 weight percent of co-blowing agent(s). The blowing agent blend more typically includes from about 80 or 75 weight percent to about 40 weight percent of co-blowing agent(s). More specifically, the blowing agent blend preferably includes from about 80 or 75 weight percent to about 50 weight percent of co-blowing agent(s).

For example, and in accordance with a preferred embodiment of the present invention, the blowing agent blend includes from about 30 weight percent to about 50 weight percent methyl formate, and from about 70 weight percent to about 50 weight percent co-blowing agent.

A nucleating agent or combination of such agents can be employed in the polymeric foaming formulation for advantages such as its capability for regulating cell formation, morphology, and performance characteristics of the foamed article. The amount of nucleating agent used depends upon the desired cell size, the selected blowing agent blend, and the desired foam density, and performance characteristics of the foamed article. The nucleating agent is generally added in amounts from about 0.02 to about 2 weight percent of the polymer resin formulation.

Some contemplated nucleating agents include inorganic materials (in small particulate form, preferably, with high aspect ratio (>20) and particle size in the micrometer to nanometer range, such as clay or nanoclay, talc, silica, and diatomaceous earth. For example, talc can be used from about 0.25 to about 2.0 weight percent of the polymer formulation. Other examples of nucleating agents include organic nucleating agents that decompose or react at the elevated temperatures to evolve gases, such as carbon dioxide and/or nitrogen. One example is a combination of an alkali metal salt of a polycarboxylic acid with a carbonate or bicarbonate. Some examples of alkali metal salts of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate, respectively), and the disodium salt of ethanedioic acid (commonly referred to as sodium oxalate), or polycarboxylic acid such as 2-hydroxy-1,2,3-propanetricarboxylic acid. Some examples of a carbonate or a bicarbonate include, but are not limited to, sodium carbonate, sodium bicarbonate, potassium carbonate, potassium bicarbonate, and calcium carbonate.

It is contemplated that mixtures of different nucleating agents can be added in the present invention. Some more desirable nucleating agents include talc, crystalline silica, and a stoichiometric mixture of citric acid and sodium bicarbonate (the stoichiometric mixture having a 1 to 100 percent concentration where the carrier is a suitable polymer). Talc can be added in a carrier or in a powder form.

If desired, a flame retardant can also be employed in the present invention. Non-limiting examples of flame retardants include bromine compounds, chloroparaffins and other chlorine compounds, antimony trioxide, and alumina trihydrates. Further, if desired, fillers, colorants, light and heat stabilizers, anti-oxidants, acid scavengers, processing aids, extrusion aids and foaming additives can be used in making the foam.

Gas permeation agents or stability control agents can be employed in the present invention to assist in preventing or inhibiting collapsing of the foam. The stability control agents suitable for use in the present invention can include the partial esters of long-chain fatty acids with polyols described in U.S. Pat. No. 3,644,230 to Cronin, saturated higher alkyl amines, saturated higher fatty acid amides, complete esters of higher fatty acids such as those described in U.S. Pat. No. 4,214,054 to Watanabe et al., and combinations thereof described in U.S. Pat. No. 5,750,584 to Knaus. The contents of each of the aforementioned patents is expressly incorporated herein by reference in its entirety.

The partial esters of fatty acids that can be used as a stability control agent include the members of the generic class known as surface active agents or surfactants. A preferred class of surfactants includes, but is not limited to, a partial ester of a fatty acid having 12 to 18 carbon atoms and a polyol having three to six hydroxyl groups. More preferably, the partial esters of a long chain fatty acid with a polyol component of the stability control agent is glycerol monostearate, glycerol distearate or mixtures thereof. It is contemplated that other agents with gas barrier properties such as nanoclays or nanofibers, cyclodextrins, zeolites (also known as molecular sieves), and other supramolecular compounds can be employed in the present invention.

Any of the variety of suitable extrusion system or other methods known in the art for dissolving blowing agent in polymers can be used in accordance with the present invention. One example of a suitable system and method includes, for example, a conventional two-extruder tandem system with each extruder having a single screw. Alternatively, a two-extruder tandem system in which the primary extruder is a twin screw, and the secondary extruder is a single screw can be used for extruding the expandable formulation of the present invention. A single extruder with proper cooling can also be employed in the present invention.

According to one process of the present invention, biodegradable polymer pellets, optionally in combination with a conventional polymer or conventional polymer blend, are admixed with a nucleating agent, such as talc. These materials are continuously fed into a hopper of an extruder. The feed mixture is conveyed forward by a screw within a barrel of the extruder as the components are mixed, compressed, heated, and converted to molten form. The conversion to molten form occurs prior to reaching an injection zone where the blowing agent is added. The blowing agent(s) of the present invention can be injected into the polymer formulation at a point where the polymer is in a melt state (i.e., beyond the feed zone). Each of the components of the blowing agent blend can be individually injected, either sequentially or simultaneously and in any order, into the polymer melt. Alternatively, the components of the blowing agent blend can be pre-mixed and the blend injected into the polymer melt. A homogeneous solution of two or more components can, at times, form an azeotropic mixture, which retains the same composition in the vapor state as in the liquid state when distilled or partially evaporated under a certain pressure. An azeotrope can be a "minimum boiling azeotrope", where the boiling temperature of the solution is less than that of the pure components, or a "maximum boiling azeotrope", where the boiling temperature of the solution is higher than that of the components. According to one embodiment, the blowing agent blend can be either a minimum or maximum boiling azeotropic mixture or a non-azeotropic mixture regardless of whether the components of the blend are injected separately or pre-mixed and then injected. If a two-extruder tandem system is used, the blowing agent(s) can be injected either in the primary or the secondary extruder or some components of the formulation can be injected in the primary extruder and the remaining components in the secondary extruder.

After injecting the blowing agent, the various components in the extruder are continuously mixed to ensure a homogeneous solution of the polymer and the blowing agent. The molten solution is then conveyed into a cooling zone where additional mixing takes place. After cooling, the solution is extruded into a holding zone maintained at a temperature and pressure that prevents or inhibits foaming of the solution. The holding zone has (a) an outlet die having an orifice opening into a zone of lower pressure such as atmospheric pressure, (b) means for closing the orifice without disturbing the foamable formulation within the holding zone, and (c) opening means for allowing the foamable solution to be ejected from the holding zone. An example of a holding zone is described in U.S. Pat. No. 4,323,528 Collins, the contents of which are incorporated in its entirety by reference herein. Regardless of whether a holding zone is used, the solution is then extruded through a die into a lower pressure zone, such as atmospheric pressure. On exit, the extrudate is either allowed to foam under ambient conditions of atmospheric pressure and room temperature or is immediately quenched to low temperatures (e.g., by contacting the extrudate with a heat exchange fluid such as water) and the solidified extrudate is chopped into small beads that can be expanded into foam structure at a later time if desired.

Figure 2:
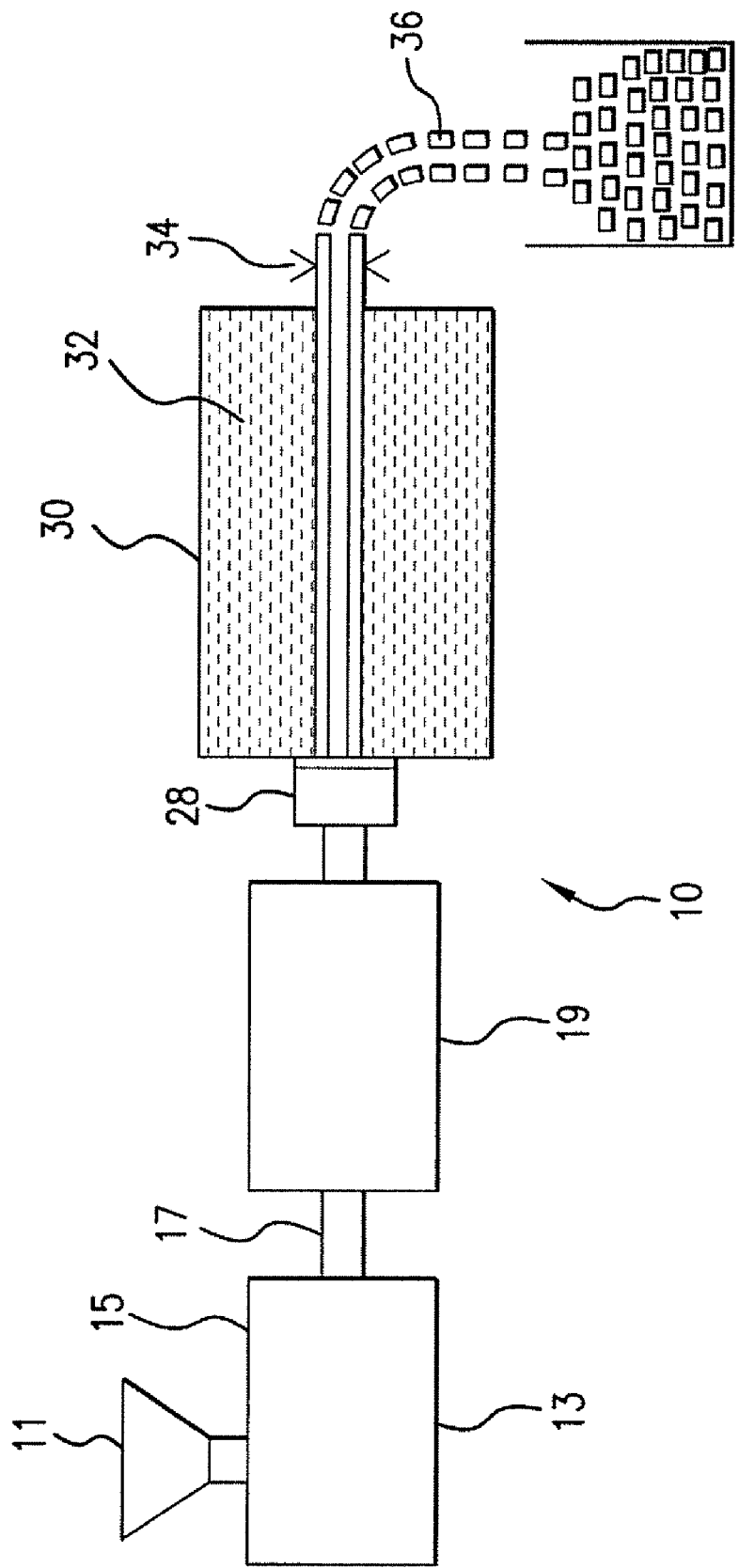
FIG. 2 is a schematic flow diagram of an overall sequence of operations involved in the manufacture of expandable beads according to one embodiment of the present invention.

According to one embodiment as applied to biodegradable polymers such as acetylated cellulosics, starch and derivatives thereof, PLA, PGA, PLGA, PCL, PEG, PHAs, Hybrane, Biomax, Ecoflex, Ecovio, and mixture thereof, a two-extruder tandem system 10 can be used for extruding a foam article (e.g., a sheet) of the present invention as depicted in FIG. 1, or for making expandable beads as depicted in FIG. 2. Polymer resin pellets are mixed with one or more additives (e.g., a nucleating agent) to form a feed mixture which is fed continuously into a hopper 11 of a primary extruder 13. The feed mixture is conveyed forward by a helical screw within the barrel of the primary extruder as the feed components are mixed, compressed, heated, and melted prior to reaching the blowing agent-injection zone. The blowing agent is added at point 15. Thus, the blowing agent of the present invention is injected at a point beyond the feed zone where the polymer exists in the melt state. If desired, the blowing agent can be injected at other locations beyond the feed zone, including into the secondary extruder.

Following injection of the blowing agent, the components are continuously mixed in the primary extruder 13. The exit pressure of the primary extruder 13 of the exemplary embodiment is generally in the range of from about 2000 to about 4000 psi. The temperature of the melt exiting the primary extruder 13 of the exemplary embodiment is generally in the range of from about 350 to about 450° F. The mixture is subsequently passed, at a high enough pressure that the blowing agent remains in solution, through a hollow adapter section 17 into a cooled secondary tandem extruder 19. The molten mixture is passed along the length of the cooled secondary extruder at low shear where cooling and additional mixing occur. The exit pressure of the secondary extruder 19 of the exemplary embodiment is generally in the range of from about 300 to about 1500 psi. The temperature of the extrudate from the secondary extruder 19 of the exemplary embodiment is generally in the range of from about 200 to about 340° F. In general, the temperature of the primary extruder should be sufficient to melt the polymer and any organic additives, and to promote efficient mixing, but not high enough to cause degradation of the thermally labile polymers. The temperature and pressure in the secondary extruder should be sufficient to maintain a homogeneous solution of the components in the melt state. The temperature at the die exit is usually adjusted to be slightly higher than the Tg or Tm of the polymer-blowing agent system. It is understood that the temperatures, pressures and other conditions can vary depending on the properties of the polymer used in the process. The specific conditions to be used are apparent to a person of skill in the art.

As seen in FIG. 1, for making foam sheet, the melt is then expressed through an annular die 21 and is allowed to undergo expansion under the ambient conditions of atmospheric pressure and room temperature in the form of an elongated bubble or tube 23, and the foamed polymer is drawn over a cylindrical surface of a cooling and sizing drum 25, and slit to form sheet stock 27, which is taken up on one or more winding reels 29. To further augment the mechanical, aesthetic, and other characteristics of the foam, the sheet thus made can be laminated with a film of solid, unfoamed polymer, where the polymer comprising the film can be the same polymer as that comprising the foam or a different polymer. In accordance with one embodiment of the invention, the film/foam composite foam structure includes a biodegradable foam structure and a film coating, where the polymer comprising the film can be a non-biodegradable thermoplastic polymer, a biodegradable polymer or a combination thereof. In accordance with yet another embodiment of the invention, the film/foam composite structure includes a non-biodegradable foam structure and a film coating, where the polymer comprising the film can be a biodegradable polymer, a non-biodegradable polymer or a combination thereof.

The film of the composite polymer foam structure can be applied by melt extruding the film-forming polymer or by heat-welding the film onto the sheet. The film can be applied on one or both surfaces, and can be applied either on-line to the sheet stock 27 before it is wound up as rolls 29 or by taking the roll 29 and applying the film in a separate process. The thickness of the film is generally from 1 to 25% of the thickness of the foam sheet, depending on the properties desired in the final product. The film can be comprised of a single layer or multiple layers and can contain nanoparticles such as, for example, nanoclays to further augment the aesthetics, mechanical properties, and gas-barrier properties of the film/foam structure. Such film/foam composite structures are different than the integral skin foam structures where a density gradient exists across the cross-section of the sheet and where the surface layers of the foam sheet have cellular structure, but a density different than that of foam in the core portion of the sheet.

Alternatively, as shown in FIG. 2, for making expandable polymeric beads, the melt is expressed through a strand or rod die 28 into a low temperature zone 30 containing a heat transfer fluid 32 such as water. In this manner, the molten solution solidifies into strands, usually about 0.05 inch in diameter, without undergoing any expansion or foaming. The continuous strands then go through chopper 34 or any other cutting apparatus, and are cut into pellets (typically 0.05 inch×0.05 inch) to form the so-called expandable beads 36. It should be noted that a die other than a strand or rod die can be used to make expandable formulation in shapes other than beads.

In another embodiment, instead of using the continuous melt process as described in FIG. 2, the expandable beads can be prepared with the blowing agent by exposing polymer pellets in the solid state to the blowing agent in a vessel for a time until the desired solubility is attained. This saturation step can be carried out at a slightly elevated temperature to accelerate the impregnation of the blowing agent into the solid pellets. However, the temperature should not be too high to allow the impregnated pellets to stick together. In yet another method, the impregnation of the blowing agent can be accomplished by performing the polymer synthesis in the presence of the blowing agent, so as to dissolve, impregnate or entrap the blowing agent in the polymer.

Figure 3:
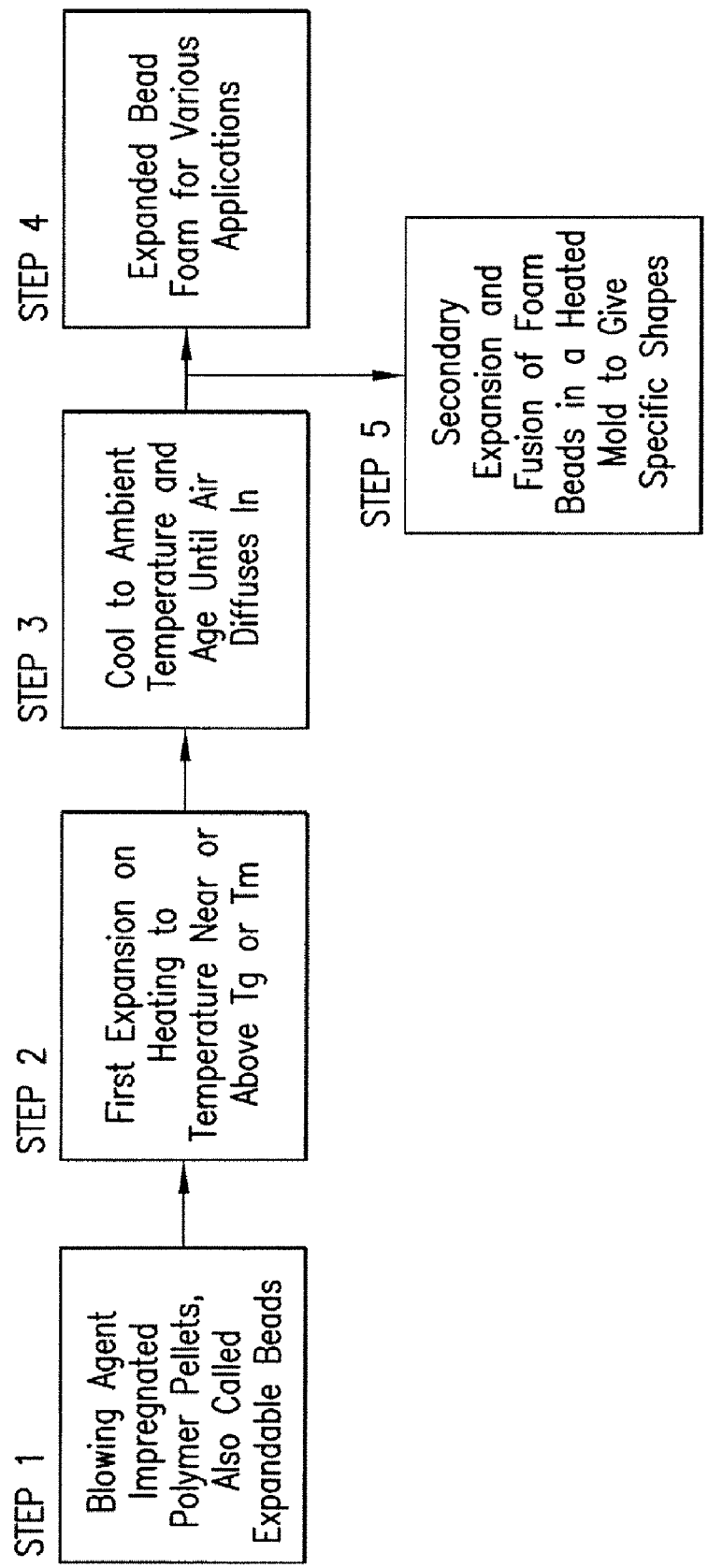
FIG. 3 is a schematic diagram of an overall sequence of operations involved in the manufacture of foam beads and articles made therefrom according to one embodiment of the present invention.

The expandable beads produced by any of the methods are then foamed as shown in FIG. 3, Step 2, by rapidly heating the beads to a temperature near or above the Tg of the polymer-blowing agent system or to a temperature near or above the Tm of the polymer-blowing agent system, e.g., by contacting the impregnated pellets with a heat exchange fluid such as high heat-content steam or a hot salt bath. The impregnated pellets can also be foamed at temperatures at or below Tm by applying mechanical pressure (compressive stress) to induce nucleation and growth of the cells as described in U.S. Pat. No. 6,080,798, the contents of which are incorporated by reference herein. Regardless of the method used, the beads undergo rapid expansion to form foam beads (Step 2), which then undergo ambient aging (Step 3), for example by cooling the beads to ambient temperature, to allow air to diffuse into the foamed beads to stabilize the dimensions. These beads can be used as such, for example for loose fill packaging, as shown in Step 4. Alternatively, the expanded and aged beads can be fused together in a heated mold as shown in Step 5, to form products of any of a variety of different shapes such as cups, plates, molded packaging, containers, planks or boards.

Further density reduction occurs during the molding operation with air and the residual blowing agent in the expanded bead providing further expansion.

Figure 4:
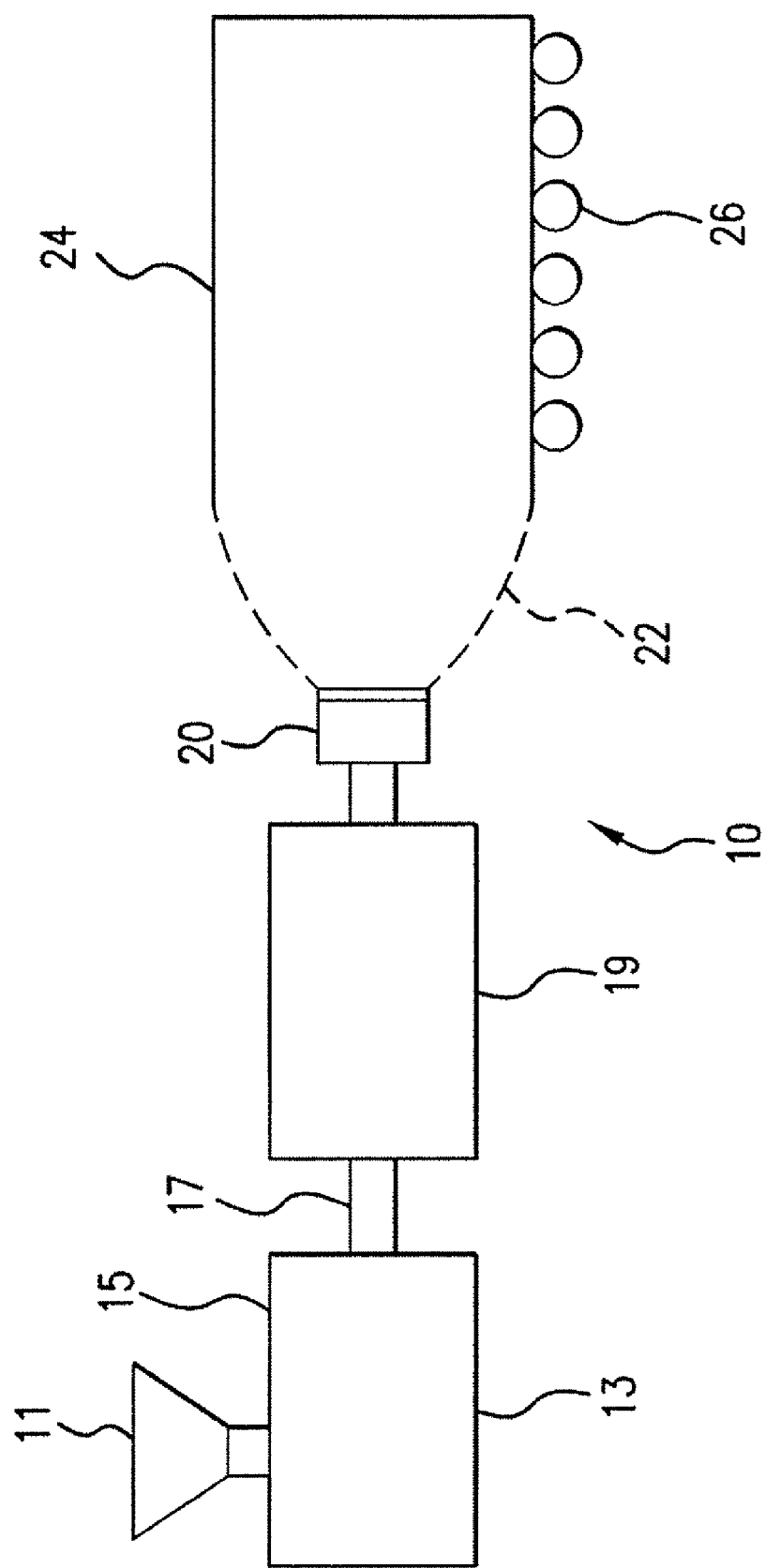
FIG. 4 is a schematic flow diagram of an overall sequence of operations involved in the manufacture of an extruded foam board or plank according to one embodiment of the present invention.

In yet another configuration, as shown in FIG. 4, the foamable formulation is expressed through a die of a different configuration such as a flat die 20 and allowed to expand in the form of a board or plank 24. The expanding extrudate 22 is moved forward by a set of rollers 26, and can be further directed to a shaping device before emerging as a board or plank 24.

Depending upon the materials and process used, the resulting foam article can be a bead, a sheet, a board, a plank, or the like. The foam beads can be further molded to form a sheet, plank or board, or into articles of various shapes, sizes, and thickness. If the article produced is a sheet, the thickness of the sheet can be up to about 0.5 inch. If the article produced is a plank or a board, the thickness is generally equal to or greater than about 0.5 inch, preferably between 0.5 inch and 3 inches.

For preparation of biodegradable polymer foam sheets, the use of an annular die is preferred. The articles produced by extrusion through an annular die are generally less than about 0.5 inch in thickness, preferably from about 0.030 to about 0.5 inch in thickness. Such foamed sheets are particularly useful as protective wrapping material and for thermoforming into various shapes such as fanfold sheets or containers for rigid packaging.

For preparation of biodegradable polymer foam boards, the use of a flat die is preferred. The articles produced by extrusion through a flat die are generally about 0.5 to about 3 inch in thickness. Such boards have particular utility as insulating, protective cushioning, or flotation materials. Regardless of the type of die used or the foam produced, the extruded foam can be subjected to further expansion or density reduction by application of heat and/or vacuum.

The foam beads, sheets, and boards or planks can be used as such, cut into other shapes, further shaped or thermoformed by application of heat and pressure, or otherwise machined or formed into shaped articles of desired size and shape as known in the art.

Depending upon the materials and process used, the resulting foamed article generally has a density from about 1 to about 15 lb/ft$^3$, with further density reduction achieved via secondary expansion by application of heat and/or vacuum. This is typically seen in foamed beads where densities less than 1.0 lb/ft$^3$ are achieved. A foamed sheet typically has a density from about 1.0 to about 9.0 lb/ft$^3$, while a foamed board typically has a density of about 1.5 to about 9.0 lb/ft$^3$. Furthermore, and in accordance with one preferred embodiment of the invention, the resultant foamed article has a substantially closed-cell structure and is defined herein as a foam having greater than about 85% closed cells and, more typically, greater than about 95% closed cells. Alternatively, and in accordance with another aspect of the invention, the resultant foamed article can be formed with 15% or more open cells, for example 20%, 25%, 30% or more open cells. Furthermore, the resulting foam structure can be controlled to include at least about 10, 15, 20, 25, 30, 35 or 40 or more cells per inch.

The foams of the present invention can be used for insulation, in various containers and packaging systems, or as protective or flexible packaging. In particular, the foam sheets of the present invention can be thermoformed into containers, such as for example, trays, bowls and plates. Generally, extruded foam sheets are used in flexible as well as rigid packaging; extruded foam planks are used in protective packaging, and foam beads are used for loose fill packaging, or are molded as sheets or planks or boards or contoured articles for flexible, protective, rigid, and insulation applications. In addition to foam sheets, planks and boards, the present invention can take the form of other shapes such as rods, tubes or contoured members.

Other uses for the foams of the present invention, as well as suitable processes, apparatus, equipment, devices and systems for the preparation thereof are described in United States patents and published Applications U.S. Pat. Nos. 6,136,875 to Wu et al.; 5,149,473 to LeDuc; 6,476,080 to Duffy; 6,599, 946 to Duffy; 6,696,504 to Hayashi; US 2004/0132844 to Francis and US 2004/0006149 to Handa, the contents of each of which are incorporated in their entirety by reference herein.

Dimensional stability is usually expressed in terms of % gauge change, which equals 100×(aged gauge−initial gauge)/initial gauge, with initial gauge determined within 15 minutes of foaming. The resulting foam of the present invention is desirably "dimensionally stable" in that the gauge of the foam after 7 days of aging does not change by more than about 15%, preferably not more than 10%, and more preferably not more than 5% from the gauge of the freshly made foam. Preferably, the foams of the invention have a dimensional change of less than about 4%, more preferably less than about 1% in any direction.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. A process for producing a biodegradable polymer foam structure comprising:
    melting a biodegradable polymer;
    dissolving an effective amount of a blowing agent in the biodegradable polymer to define a mixture in a melt state, the blowing agent being a blend comprising from about 1 weight percent to about 99 weight percent methyl formate and 1,1,1,2-tetrafluoroethane (HFC-134a), wherein the mixture is maintained as a homogeneous solution in the melt state;
    forming an extrudate in the melt state from the mixture; and
    expanding the extrudate from the melt state to form the biodegradable polymer foam structure, wherein the foam structure is a substantially closed-cell and dimensionally stable board or sheet.

2. A process for producing a biodegradable polymer foam structure comprising:
    preparing an expandable polymeric formulation comprising a biodegradable polymer and a blowing agent, the blowing agent comprising methyl formate and at least one coblowing agent having a volatility higher than methyl formate;
    forming the formulation into expandable beads; and
    expanding the expandable beads to form a substantially closed-cell and dimensionally stable biodegradable polymer foam structure.

3. The process of claim 2, wherein preparing the expandable polymeric formulation further includes a process selected from the group consisting of (a), (b), and (c):
    a. (i) melting a biodegradable polymer;
        (ii) mixing an effective amount of the blowing agent in the biodegradable polymer to define a mixture; and
        (iii) extruding the mixture into a low temperature zone to form the expandable beads;
    b. dissolving an effective amount of the blowing agent into the biodegradable polymer;
    c. synthesizing the biodegradable polymer in the presence of the blowing agent.

4. The process of claim 1, wherein the blowing agent blend further comprises at least one additional co-blowing agent selected from the group consisting of hydrocarbon, a halogenated hydrocarbon, an ester, an ether, an acetal, an alkanol, a carbonate, an amine, a ketone, an inorganic agent and a chemical blowing agent.

5. The process of claim 4, wherein the at least one additional co-blowing agent is selected from the group consisting of ethane, propane, n-butane, isobutane, isopentane, 1,1-difluoroethane (HFC-152a), trans-1,2-dichloroethylene, 1,1,1,3,3-pentafluoropropane (HFC-245fa), dimethyl ether, carbon dioxide, and any combination thereof.

6. The process of claim 1, wherein the biodegradable polymer includes poly(lactic acid) (PLA), poly(glycolic acid) (PGA), poly(lactide-co-glycolide) (PLGA), poly(caprolactone) (PCL), poly(ethylene glycol) (PEG), poly(hydroxy alkanoates) (PHA), dendritic polymers with acidic, hydroxyl and ester functional groups, modified polyesters, acetylated cellulose, starch, a starch derivative, a co-polymer of PLA and a modified polyester, or a combination thereof.

7. The process of claim 1, wherein the process further includes the step of blending at least one non-biodegradable thermoplastic polymer with the biodegradable polymer prior to the dissolving step.

8. The process of claim 7, wherein the process further includes the step of adding at least one compatibilizer to the biodegradable and non-biodegradable polymers prior to the dissolving step.

9. The process of claim 7, wherein the non-biodegradable thermoplastic polymer is an alkenyl aromatic polymer, an acrylic polymer, a polyolefin, or mixtures thereof.

10. The process of claim 1, wherein the polymer foam structure has a density of about 1 to 15 lb/ft$^3$.

11. The process of claim 1, wherein the expandable polymeric formulation comprises from about 1 weight percent to about 20 weight percent blowing agent.

12. The process of claim 1, wherein the expandable polymeric formulation comprises from about 3 weight percent to about 9 weight percent blowing agent.

13. The process of claim 1, wherein the biodegradable polymer foam structure is a thermoformable sheet.

14. A biodegradable polymer foam structure prepared by a process comprising:
    melting a biodegradable polymer,
    dissolving an effective amount of a blowing agent blend in the biodegradable polymer to define a mixture in the melt state, the blowing agent being a blend comprising methyl formate and 1,1,1,2-tetrafluoroethane (HFC-134a), wherein the mixture is maintained as a homogeneous solution in the melt state;
    forming an extrudate from the mixture; and
    expanding the extrudate to form a biodegradable polymer foam structure, wherein the foam structure is a substantially closed-cell and dimensionally stable board or sheet.

15. A biodegradable polymer foam structure prepared by a process comprising:
    preparing an expandable polymeric formulation comprising a biodegradable polymer and a blowing agent, the blowing agent comprising methyl formate and at least one coblowing agent having a volatility higher than methyl formate;

forming the formulation into expandable beads; and expanding the expandable beads to form a biodegradable polymer foam structure having a density less than about 15 lb/ft$^3$.

16. The polymer foam structure of claim 14, wherein the blowing agent blend comprises from about 1 weight percent to about 99 weight percent methyl formate.

17. The polymer foam structure of claim 16, wherein the blowing agent blend further comprises at least one additional co-blowing agent is selected from the group consisting of hydrocarbon, a halogenated hydrocarbon, an ester, an ether, an acetal, an alkanol, a carbonate, an amine, a ketone, an inorganic agent and a chemical blowing agent.

18. A composite polymer foam structure comprising a biodegradable foam structure according to claim 14, and a film coating disposed on the foam, the film coating comprising a non-biodegradable thermoplastic polymer, a biodegradable polymer, or a combination thereof.

19. A biodegradable polymer foam structure prepared by a process comprising:

preparing an expandable polymeric formulation comprising a biodegradable polymer and a blowing agent blend, the blowing agent blend comprising methyl formate, a hydrocarbon, and carbon dioxide; and expanding the formulation to form a substantially closed-cell and dimensionally stable biodegradable polymer foam structure.

20. The biodegradable polymer foam structure of claim 19, wherein the hydrocarbon is a $C_2$ to $C_5$ hydrocarbon.

21. A biodegradable polymer foam structure prepared by a process comprising:

preparing an expandable polymeric formulation comprising a biodegradable polymer and a blowing agent blend, the blowing agent blend comprising methyl formate, a low volatility blowing agent and a high volatility blowing agent; and expanding the formulation to form a substantially closed-cell and dimensionally stable biodegradable polymer foam structure.

22. A biodegradable polymer foam structure prepared by a process comprising:

preparing an expandable polymeric formulation comprising a biodegradable polymer and a blowing agent blend, the blowing agent blend comprising methyl formate and at least one co-blowing agent, wherein the at least one co-blowing agent has volatility higher than methyl formate; and expanding the formulation to form a substantially closed-cell and dimensionally stable biodegradable polymer foam structure.

23. A biodegradable polymer foam structure prepared by a process comprising:

preparing an expandable polymeric formulation comprising a biodegradable polymer and a blowing agent, the blowing agent is a blend consisting essentially of methyl formate, carbon dioxide, and optionally a hydrocarbon; and expanding the formulation to form a substantially closed-cell and dimensionally stable biodegradable polymer foam structure.

24. The biodegradable polymer foam structure of claim 23, wherein preparing the expandable polymeric formulation further includes forming the formulation into expandable beads prior to the expanding step.

25. A process for producing a biodegradable polymer foam structure comprising:

melting a biodegradable polymer;

dissolving an effective amount of a blowing agent in the biodegradable polymer to define a mixture in a melt state, the blowing agent being a blend comprising methyl formate, $CO_2$ and a $C_2$-$C_5$ hydrocarbon, wherein the mixture is maintained as a homogeneous solution in the melt state;

forming an extrudate in the melt state from the mixture; and expanding the extrudate from the melt state to form the biodegradable polymer foam structure, wherein the foam structure is a substantially closed-cell and dimensionally stable board or sheet.

26. The process of claim 25, wherein the blowing agent blend comprises methyl formate, $CO_2$, and i-butane.

27. The process of claim 2, wherein the blowing agent is a blend comprising methyl formate, $CO_2$, and i-butane.

28. A process for producing a biodegradable polymer foam structure comprising:

melting a biodegradable polymer;

dissolving an effective amount of a blowing agent in the biodegradable polymer to define a mixture in a melt state, the blowing agent being a blend comprising methyl formate and $CO_2$, wherein the mixture is maintained as a homogeneous solution in the melt state;

forming an extrudate in the melt state from the mixture; and expanding the extrudate from the melt state to form the biodegradable polymer foam structure, wherein the foam structure is a substantially closed-cell and dimensionally stable board or sheet.

29. The process of claim 2, wherein the blowing agent is a blend comprising methyl formate and $CO_2$.

* * * * *